No. 659,827. Patented Oct. 16, 1900.
C. W. B. PUTNAM.
SHAFT COUPLING.
(Application filed May 14, 1900.)

(No Model.) 2 Sheets—Sheet 1.

Witnesses.
W. J. Baldwin
M. E. Regan

Inventor.
Chas. W. B. Putnam
By
Southgate & Southgate
Attorneys.

No. 659,827. Patented Oct. 16, 1900.
C. W. B. PUTNAM.
SHAFT COUPLING.
(Application filed May 14, 1900.)

(No Model.) 2 Sheets—Sheet 2.

Witnesses.
W. J. Baldwin
M. E. Regan

Inventor.
Chas. W. B. Putnam
By
Southgate & Southgate
Attorneys.

UNITED STATES PATENT OFFICE.

CHARLES W. B. PUTNAM, OF FITCHBURG, MASSACHUSETTS.

SHAFT-COUPLING.

SPECIFICATION forming part of Letters Patent No. 659,827, dated October 16, 1900.

Application filed May 14, 1900. Serial No. 16,564. (No model.)

*To all whom it may concern:*

Be it known that I, CHARLES W. B. PUTNAM, a citizen of the United States, residing at Fitchburg, in the county of Worcester and State of Massachusetts, have invented a new and useful Shaft-Coupling, of which the following is a specification.

The object of this invention is to provide a light-running, efficient, inexpensive, and durable shaft-coupling in which the jar or shock due to the reversal of reciprocating parts is avoided and in which the parts are so combined and mounted that they will not cramp or wear heavily upon each other.

To this end the invention consists of the shaft-coupling and of the combinations of parts therein, as hereinafter described, and more particularly pointed out in the claims at the end of this specification.

Figure 1:
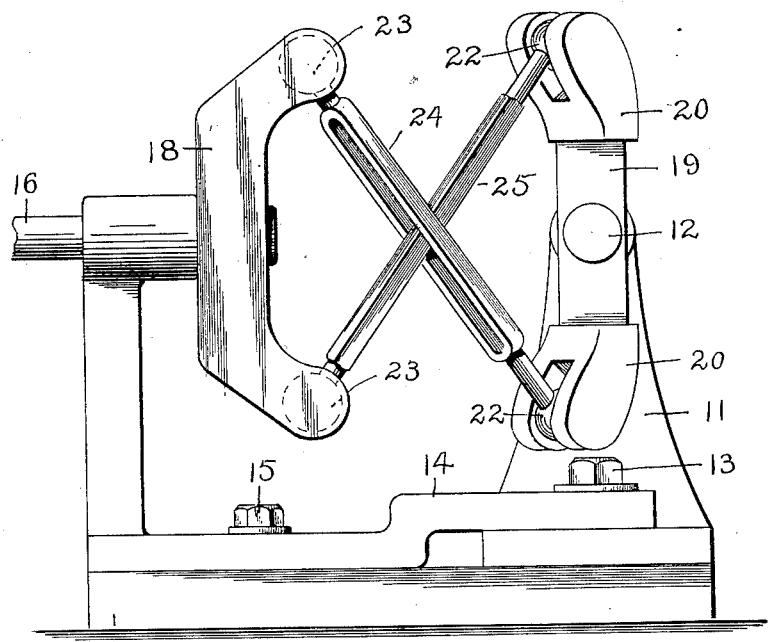
Figure 2:
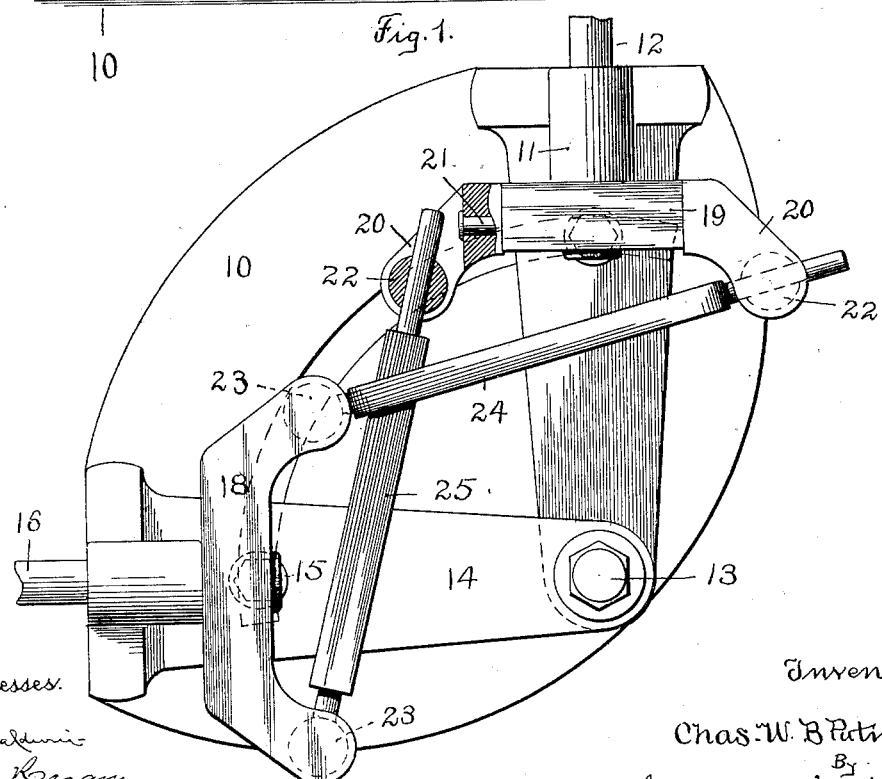
Figure 3:
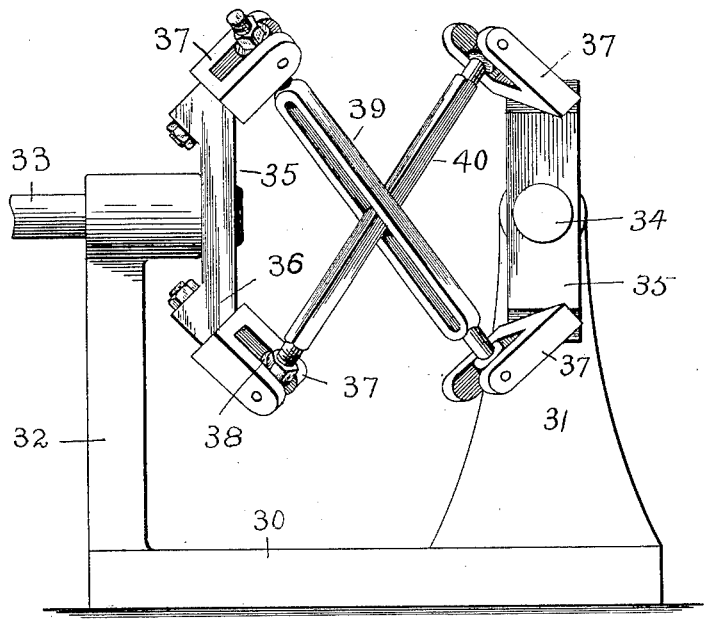
Figure 4:
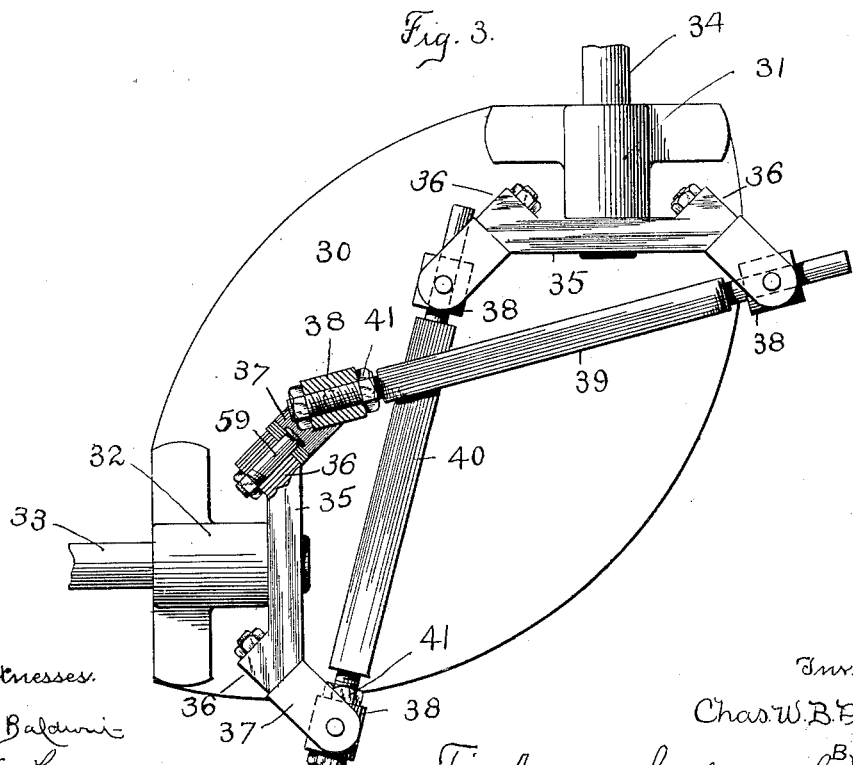

In the accompanying two sheets of drawings, Figure 1 is a side view of the shaft-coupling constructed according to this invention. Fig. 2 is a plan view of the same, the shafts having been given each a quarter-turn from the position illustrated in Fig. 1. Fig. 3 illustrates a slightly-modified form of shaft-coupling; and Fig. 4 is a plan view of the same, the shafts having been given a quarter-turn from the position illustrated in Fig. 3.

To connect two shafts together at various angles, a considerable variety of shaft-couplings have been proposed. In some of these prior shaft-couplings the parts have been arranged so that they will bind or cramp upon each other, tending to produce heavy friction and quick wear. In certain other types of shaft-couplings it has been proposed to employ a reciprocating piece or connection which is moved from one shaft and is connected to turn the other shaft. This form of shaft-coupling can be used to advantage for transmitting comparatively-low speeds; but when shafts are to be driven at high speeds this form of shaft-coupling is objectionable on account of the jar or shock due to the reversal of the motion of the reciprocating piece.

The especial object of my present invention is therefore to provide a shaft-coupling in which the parts are arranged so that they will not wear or cramp and in which the jar or shock due to the reversal of the reciprocating parts will be entirely avoided. To accomplish this object, I have devised a shaft-coupling in which motion is transmitted by means of a pair of diagonal links having a sliding connection with each other. These diagonal links are connected to cross-pieces or crank-arms on the shaft by means of suitable universal joints. The point of contact or connection between the diagonal links forms in effect a shifting crank-center, which receives motion from one shaft and transmits motion to the driven shaft. The universal joints or points of connection between the links and the shaft cross-pieces and the points of contact between the diagonal links or the "shifting crank-center," as it may be termed, are always maintained in one plane, and in operation the plane of these points simply turns or revolves so as to insure an easy-running perfectly-balanced motion.

Referring to the form of shaft-coupling illustrated in the first sheet of drawings, 10 designates a base-piece or foundation-plate, extending up from which is a bearing 11, journaled in which is a shaft 12. Pivoted on a bolt or stud 13 is an adjustable bearing-piece 14, which may be clamped or secured in different relative positions by means of the clamping-bolt 15. Journaled in the movable bearing-piece 14 is a shaft 16. The shaft 16 is provided at its end with a cross-piece or crank-arms 18, and the shaft 12 is provided at its end with a cross-piece 19. Pivoted on the cross-piece 19 by means of studs 21, as shown in Fig. 2, are bearing-pieces 20. Socketed in the bearing-pieces 20 are balls 22, and socketed in the shaft cross-piece 18 are balls 23. Connecting the balls 22 and 23 are the diagonal or cross links 24 and 25. The link 24 is preferably slotted longitudinally to receive the link 25, and I prefer to employ this form of connection to form a sliding joint between the diagonal links, although I am aware that said diagonal links may be differently connected, if desired. The links 24 and 25 are preferably formed integral with the balls 23 and are provided with stems which are longitudinally movable through the balls 22, as most clearly illustrated in Fig. 2. By means of this construction I have provided a shaft-coupling which may be used for coupling shafts which meet at different angles and which may be operated without jar or excessive wear at relatively-high speeds.

Either of the shafts 16 or 12 may be used as a driving-shaft. For example, if power is applied to the shaft 16, so that the shaft 16 may be considered the driving-shaft and the shaft 12 the driven shaft, the rotation of the shaft 16 through the cross-bar 18 will transmit pressure to the point of contact between the diagonal links 24 and 25, which point of contact between said diagonal links becomes in effect a shifting crank-point, through which power will be transmitted to the cross-piece 19 of the driven shaft 12.

The universal joints which connect the diagonal links with the shaft cross-pieces and the point of engagement between said diagonal links will always remain in one plane, which plane will be turned or rotated, so that a perfectly-balanced easy-running motion will be secured.

In the second sheet of drawings I have shown a construction which dispenses with the use of balls and socket-joints and which can be somewhat more readily fitted together than the form of construction illustrated in the first sheet of drawings.

Referring to the second sheet of drawings and in detail, the shaft-coupling therein illustrated comprises a base piece or casting 30, having integral bearings 31 and 32. Journaled in the bearings 31 and 32 are the shafts 33 and 34. As shown, the shaft-coupling is designed to couple together shafts 33 and 34 at right angles to each other. Secured on the shafts are cross-pieces 35. The cross-pieces 35 are provided at their ends with sections 36, which are offset or slanted at an angle of forty-five degrees. Journaled in the offset sections 36 on studs 59, as shown in Fig. 4, are bearing pieces or yokes 37. Supported on trunnions in the bearing-pieces 37 are the boxes 38. Connecting the boxes 38 are the diagonal links 39 and 40. The diagonal links 39 and 40 are held from longitudinal movement through the boxes carried by one shaft by means of nuts 41, but are left free to move longitudinally through the boxes at their opposite ends. The operation of this form of shaft-coupling is substantially the same as that of the modification illustrated in Fig. 1 and need not be again described.

Shaft-couplings constructed according to my invention may, if desired, be inclosed with suitable casings and may run in a suitable lubricant, as in the ordinary practice in the use of shaft-couplings.

I am aware that many changes may be made in the construction and in the application of various uses to which my shaft-couplings may be put by those skilled in the art without departing from the scope of my invention as expressed in the claims. I do not wish, therefore, to be limited to the forms herein shown and described; but What I do claim, and desire to secure by Letters Patent of the United States, is—

1. In a shaft-coupling, the combination of a driving-shaft, a shaft to be driven, cross-pieces or crank-arms secured on the ends of the shafts, and links connecting diagonally-opposite ends of said cross-pieces and having a sliding connection with each other, substantially as described.

2. In a shaft-coupling, the combination of a driving-shaft, a shaft to be driven, cross-pieces secured on the ends of the shafts, two diagonal links having a sliding connection with each other, and universal joints connecting the links and cross-pieces, substantially as described.

3. In a shaft-coupling, the combination of a driving-shaft, a shaft to be driven, cross-pieces secured on the ends of the shafts, diagonal links having a sliding connection with each other and universal joints connecting the links and cross-pieces, said joints being constructed so that each link may have a longitudinal movement through one of said universal joints, substantially as described.

4. In a shaft-coupling, the combination of a driving-shaft, a shaft to be driven, cross-pieces or crank-arms secured on the ends of the shafts, and the pair of diagonal links connecting said cross-pieces, one of said links having a longitudinal slot through which the other link passes, substantially as described.

5. In a shaft-coupling, the combination of a driving-shaft, a shaft to be driven, cross-pieces or crank-arms secured on the ends of the shafts, bearing-pieces, the yokes pivotally mounted on said cross-pieces, boxes supported on trunnions in the yokes, and a pair of diagonal links mounted in said boxes, each of said links having a longitudinal movement through one box, substantially as described.

6. In a shaft-coupling, the combination of a driving-shaft, a shaft to be driven, cross-pieces secured on the ends of said shafts, and having end sections offset at an angle of forty-five degrees from the line of said shafts, bearing pieces or yokes journaled in said offset portions, boxes mounted on trunnions in said yokes, a pair of diagonal links connecting said boxes, one link being provided with a longitudinal slot through which the other link passes, and nuts for holding said links from longitudinal movement with respect to the box at one end of said links, while leaving them free to move longitudinally through the other box, substantially as described.

In testimony whereof I have hereunto set my hand in the presence of two subscribing witnesses.

CHARLES W. B. PUTNAM.

Witnesses:
PHILIP W. SOUTHGATE,
LOUIS W. SOUTHGATE.